United States Patent [19]
Bowman

[11] 3,982,455
[45] Sept. 28, 1976

[54] DEVICE FOR SLITTING BILLETS

[75] Inventor: Raymond Earl Bowman, Oshawa, Canada

[73] Assignee: Co-Steel International Limited, Whitby, Canada

[22] Filed: Mar. 25, 1975

[21] Appl. No.: 561,776

[52] U.S. Cl. .................................. 83/105; 83/162; 83/171; 83/430; 83/435; 83/505; 83/444
[51] Int. Cl.² ...................... B26D 1/22; B26D 1/28; B26D 7/06
[58] Field of Search ............ 83/105, 107, 156, 162, 83/430, 435, 436, 505, 508.3, 425.3, 924, 171, 444, 446, 448; 225/97, 99, 104

[56] References Cited
UNITED STATES PATENTS

| | | | |
|---|---|---|---|
| 1,881,020 | 10/1932 | McFarland | 83/446 X |
| 1,910,271 | 5/1933 | Williams | 83/105 X |
| 3,314,321 | 4/1967 | Fauconniere | 83/444 X |
| 3,670,606 | 6/1972 | Blomgren, Sr. et al. | 83/171 X |

*Primary Examiner*—Willie G. Abercrombie

[57] ABSTRACT

A device for slitting billets rolled to produce a multiple stranded bar, in which a guide member and support rollers direct the multiple stranded bar, emerging from a stand, against a rotary knife having a circular blade bevelled peripherally to provide shoulders over which individual strands will ride, thus splitting the bar in advance of the knife. Passages behind the knife channel the individual strands.

10 Claims, 10 Drawing Figures

DEVICE FOR SLITTING BILLETS

This invention relates to the production of metal bars and more particularly to a device for slitting billets rolled, to produce a multiple stranded bar.

Heated billets of metal are passed through a series of stands having paired rolls which reduce the billets in stages to produce bars of a given size and shape, for example reinforcing steel bars. Because only a certain maximum output of bars can be produced by this method at any predetermined speed of delivery a technique has been developed for rolling a billet to form a double stranded bar with an interconnecting web and then slitting the web longitudinally by passing it over a fixed knife. Such knives are, however, subject to heavy wear and must be replaced frequently, causing expense in maintenance and loss of production while the stands are idle.

It is an object of the present invention to provide an improved device for slitting double stranded bars, rolled from billets, to form separate bars.

In its broadest aspect the invention consists of a device for slitting billets rolled to produce a multiple stranded bar comprising: a frame; a guide member mounted on the frame and having a passage therethrough, the guide member being locatable between the rolls of a stand; a circular knife rotatably mounted on the frame behind the guide member and having a blade peripherally bevelled to provide at least one pair of lateral shoulders; means mounted on the frame below the knife to direct the strands against the shoulders of the knife blade whereby the strand is split in advance thereof; means mounted on the frame behind the knife and having separate passages to receive and channel the individual strands split by the knife; the guide member, the directional means, and the delivery means forming a linear path axially with the gap between the rolls of the stand.

Example embodiments of the invention are shown in the accompanying drawings in which.

Figure 4:
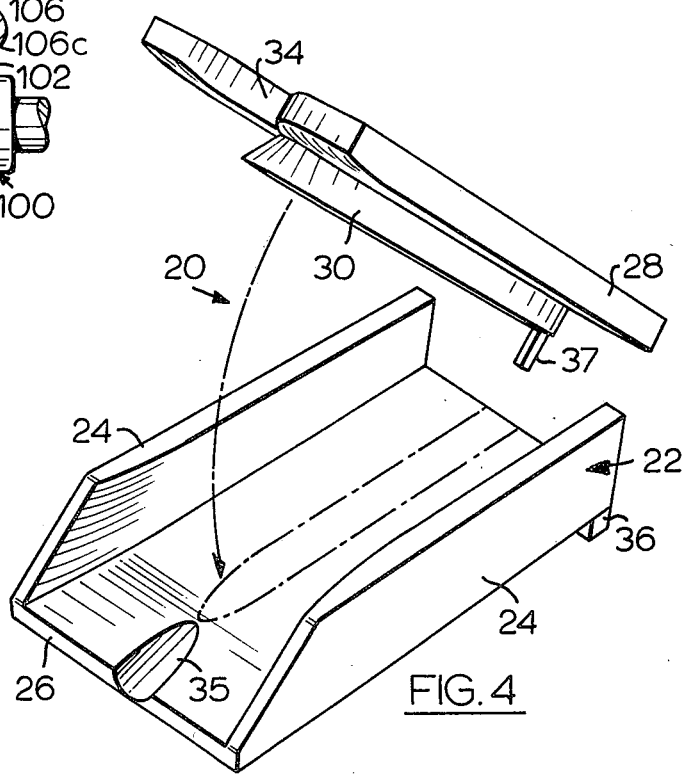
FIG. 4 is an exploded perspective view of the channel box of the device of FIG. 1.

The example embodiment shown in FIGS. 1 to 7 of the drawings consists of a slitting device 10 comprising a frame 12 having a pair of parallel side walls 14 with legs 16 and an interconnecting bottom wall 18. Channel means in the form of a box 20 fits between side walls 14 and rests on bottom wall 18. As seen in FIG. 4, channel box 20 comprises a trough 22 having parallel sides 24 and a bottom 26, and a cover 28 which rests on sides 24. The underside of cover 28 carries a divider 30 which provides two parallel passages 32 in channel box 20. The front lip of cover 28 has a notch 34 and the front lip of bottom 26 has a groove 35 to accomodate a slitting knife to be described. The rear end of bottom 26 carries a locating rib 36 to abut bottom wall 18 of frame 12 and the rear end of cover 28 carries a locating post 37 to abut bottom 26. A pair of opposed slots 38 in side walls 14 of frame 12 receive a bridging bar 39 which carries a clamping screw 40 bearing on cover 28 to hold channel box 20 in position against bottom wall 18 of the frame.

A pair of parallel shafts 42 and 44 bridge side walls 14 in front of channel box 20, the shafts being removably keyed in the side walls by a pair of bar clamps 46 each removably secured in a slot 48 by a bolt 50. A circular slitting knife 52 is journally mounted on upper shaft 42 as seen particularly in FIG. 7. Knife 52 comprises a shank 54 carrying a centrally disposed circular blade 56 which is bevelled to provide an edge 57 and a pair of lateral shoulders 58. Blade 56 divides an annular depression in the shank into two annular recesses 59. A pair of support rollers 60 are journally mounted on lower shaft 44 adjacent shank 54 of knife 52 and spaced apart laterally to provide clearance for blade 56. Rollers 60 are in an advanced position relative to knife 52 to clear the front lip of bottom 26 of channel box 20, blade 56 being accommodated in notch 34 of cover 28 and groove 35 of bottom 26, and also to support the strands being slit by the knife.

A first spray head 62 is supported above delivery box 20 between side walls 14 and leads from a threaded elbow 64 in one side wall. Spray head 62 has a perforation 65 in the direction of knife blade 56. A second spray head 66 is supported below channel box 20 between side walls 14 and leads from a conduit 67 through a threaded connecting passage 68 in one side wall. Spray head 66 has a row of perforations 69 in the direction of rollers 60.

Figure 5:
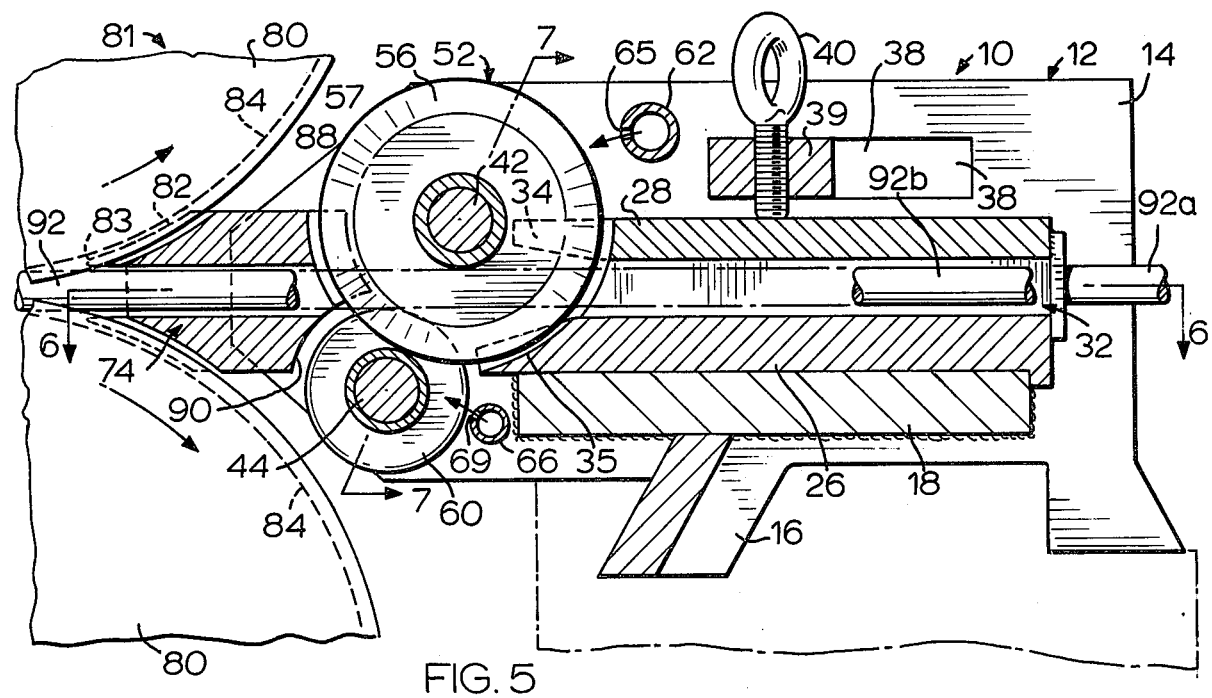
FIG. 5 is a cross-sectional view taken along line 5—5 of FIG. 1 and showing the device in association with a stand and a double stranded bar.

A pair of opposed slots 70 in the forward end of side walls 14 receive the lateral ribs 72 of a guide member 74 which has a tapering nose 76 with upper and lower arcuate surfaces 78 shaped to lie between a pair of forming rolls 80 of a stand 81 as seen in FIG. 5. Surfaces 78 of nose 76 each carry a pair of ribs 82 which are receivable in the annular forming grooves 84 in each roll 80 of stand 81. Each rib 82 has a forwardly projecting lip 83. A passage 86 leads from nose 76 rearwardly through guide member 74 in alignment with passages 32 in channel box 20. The uppermost portions of rollers 60 are in general alignment with passages 86 and with passages 32. The rearward portion of guide member 74 has an upper groove 88 to accommodate knife blade 56 and a lower bevel 90 to accommodate rollers 60.

Figure 8:
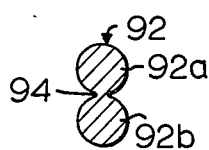
FIG. 8 is a cross-sectional view of the rolled bar taken along line 8—8 of FIG. 6.
Figure 7:
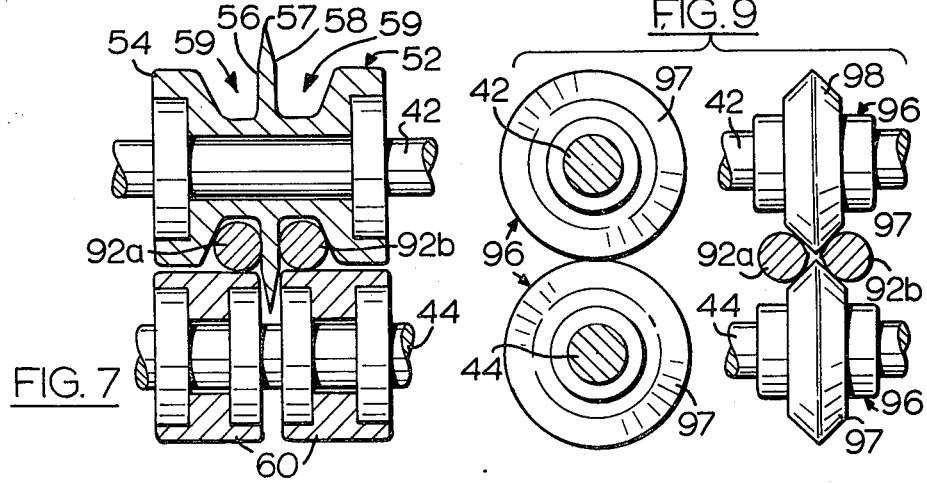
FIG. 7 is a cross-sectional view taken along line 7—7 of FIG. 5 looking along the rolled bar.

In the operation of the example embodiment, a hot metal billet is rolled to form a double stranded bar 92 as seen in FIG. 8 of the drawings. Strands 92a and 92b are joined by a thin interconnecting web 94 as the metal emerges from forming rolls 80 of stand 81. Channel box 20, rotary knife 52, rollers 60, and guide member 74 of slitting device 10 are preselected to provide free passage of double stranded bar 92 and its component individual strands 92a and 92b while the bar is being slit. Slitting device 10 is then assembled and positioned adjacent the exit of stand 81 as shown in FIG. 5 with ribs 82 of guide member 74 located in annular grooves 84 of rolls 80. Conduits 62 and 66 are connected with a source of pressurized water.

Figure 6:
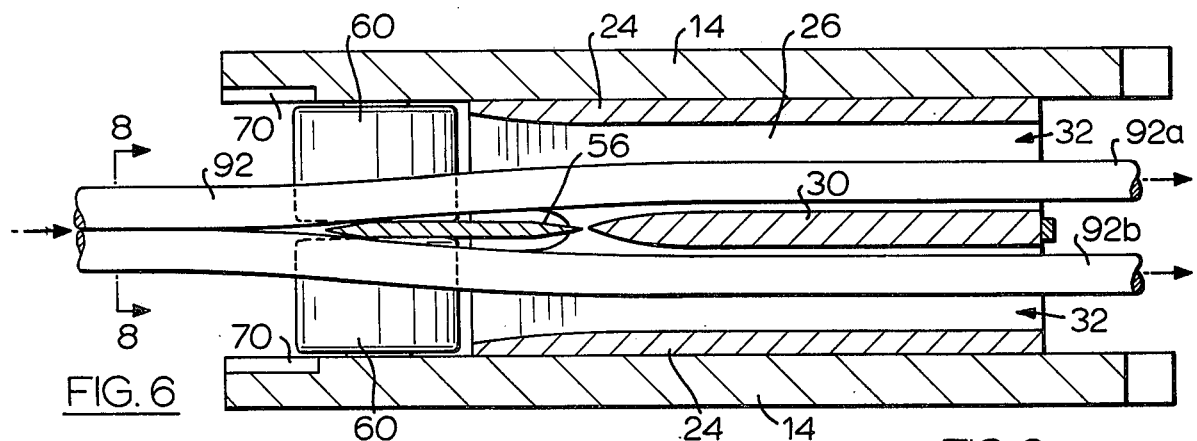
FIG. 6 is a cross-sectional view taken along line 6—6 of FIG. 5.

With slitting device 10 assembled and positioned, double stranded bar 92 is passed continuously through stand 81 and into the slitting device, passing first through passage 86 of guide member 74 and then against circular blade 56 of rotary knife 52. Lips 83 of ribs 82, resting in grooves 84 of rolls 80, act to peel bar 92 from one or other of the rolls. As seen in FIG. 6, blade 56 acts as a wedge to split web 94 of double stranded bar 92 and after initial contact of the web with knife edge 57 of the blade at the end of bar 92 the only constant contact between the knife and individual strands 92a and 92b is with shoulders 58 of the blade. The movement of strands 92a and 92b across the blade at an oblique angle causes knife 52 to rotate on shaft 42 which reduces the constant heavy wear of shoulders 58 of blade 56. Such rotation also reduces the wear on knife edge 57. After passing on each side of blade 56, strands 92a and 92b continue their travel through passages 32 of channel box 20 and emerge from the rear of the passage means as individual spaced bars.

To cool blade 56 and rollers 60, water under pressure is constantly sprayed from conduits 62 and 66 respectively.

Figure 1:
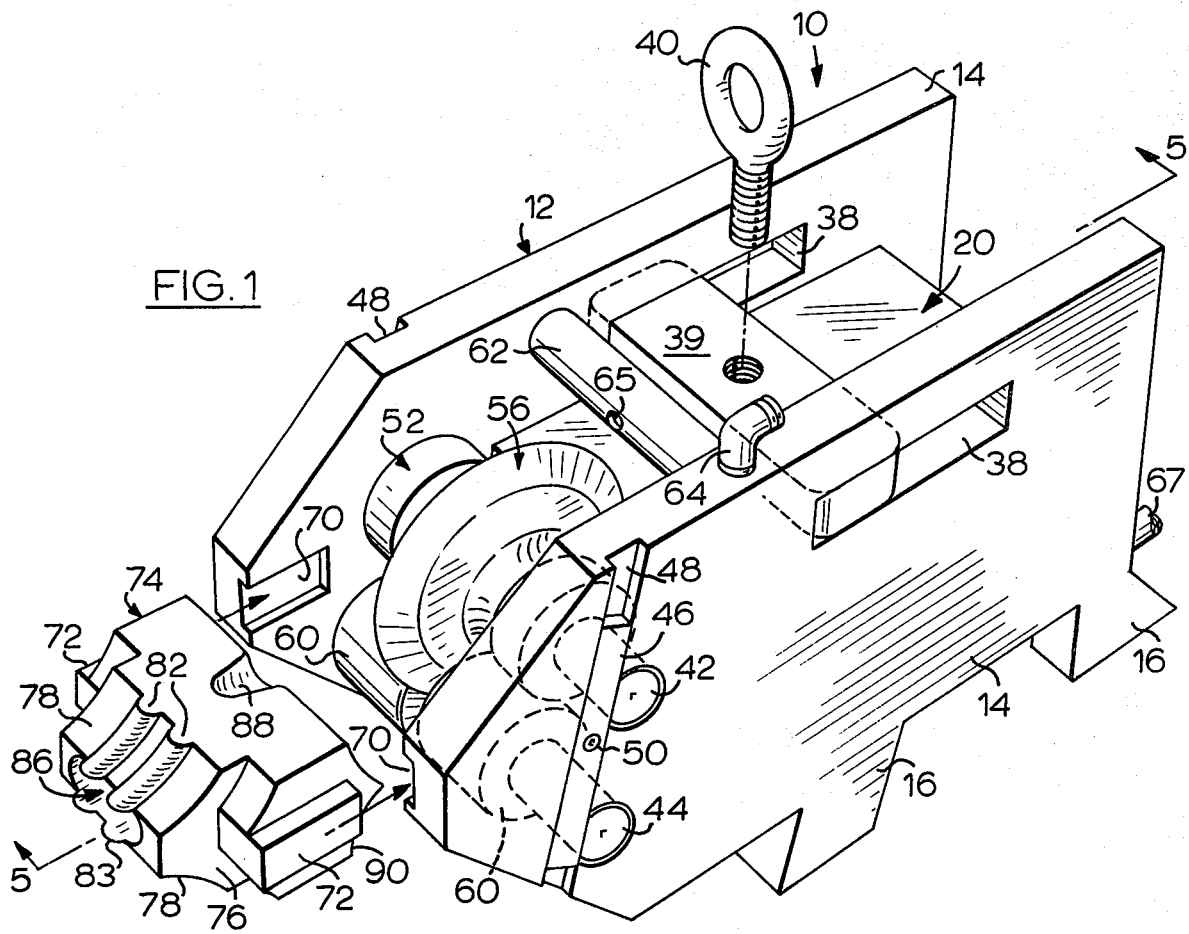
FIG. 1 is a top perspective view of a slitting device.
Figure 2:
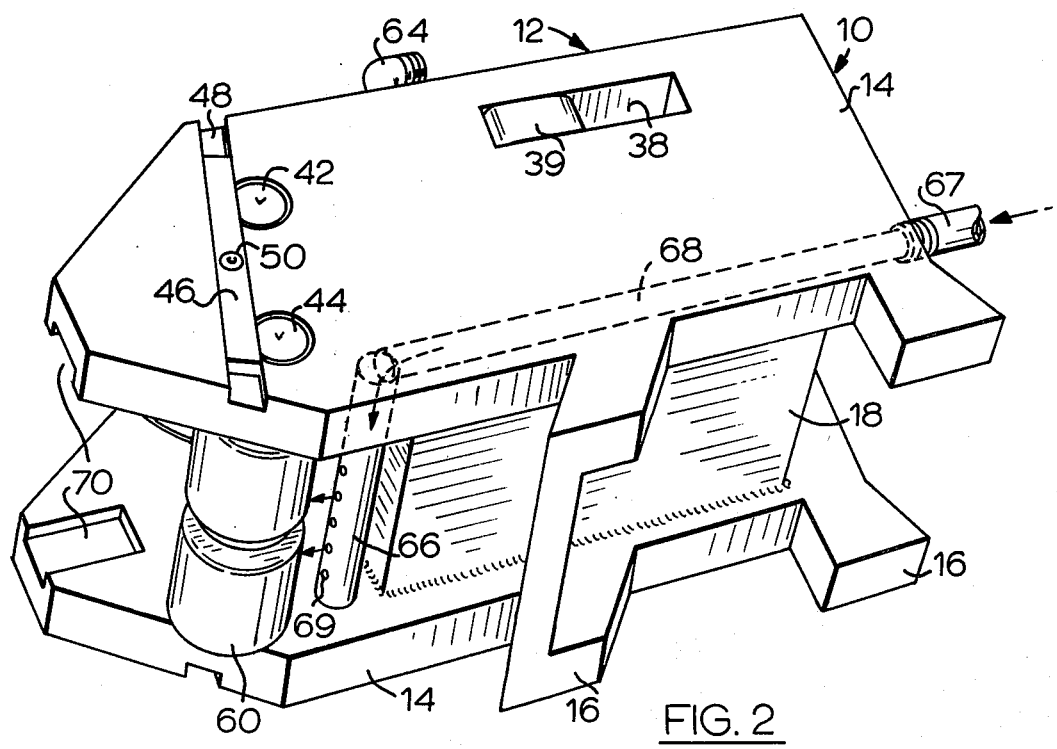
FIG. 2 is a bottom perspective view of the device of FIG. 1.
Figure 3:
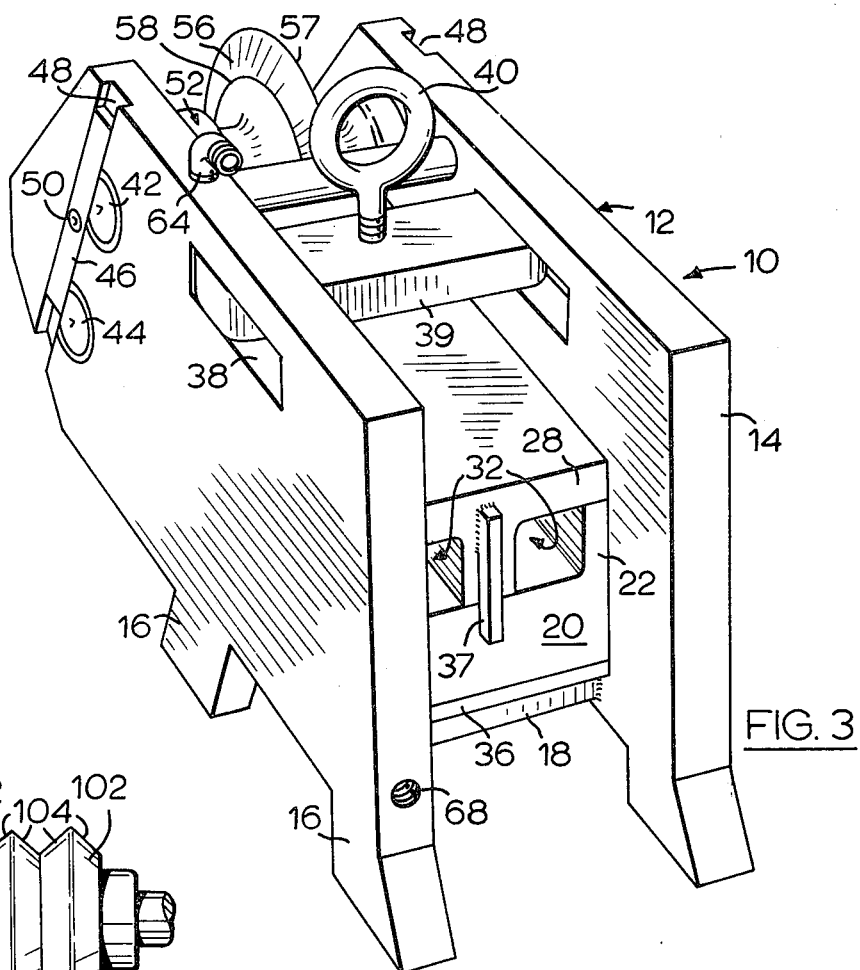
FIG. 3 is a rear perspective view of the device of FIG. 1.
Figure 10:
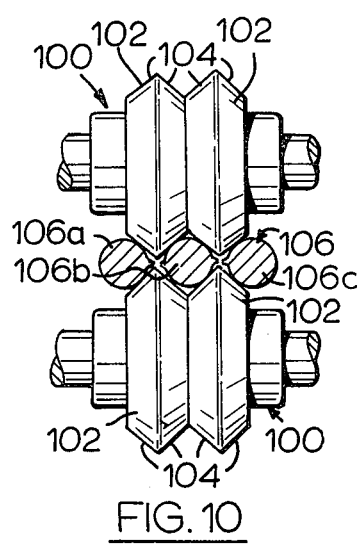
FIG. 10 (shown on the sheet with FIG. 3) is similar to the end view of FIG. 9 showing a pair of double-edged rotary slitting knives.
Figure 9:
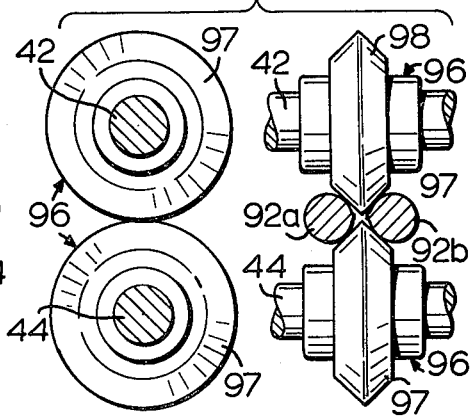
FIG. 9 is a side and an end view of an alternative embodiment showing a pair of rotary slitting knives.

In the alternate embodiment of the invention shown in FIG. 9 of the drawings, rotary knife 52 and rollers 60 are replaced by a pair of opposed rotary knives 96 each having a circular blade 97 which is peripherally bevelled to provide a pair of lateral faces 98. Since knives 96 must be positioned vertically one above the other to provide a free passage for strands 92a and 92b between them, frame 12 of channel box 20 must be modified by reorienting slot 48 and bar clamps 46 vertically. As seen in FIG. 9, the entry of double stranded bar 92 into the gaps between faces 98 of rotary knives 96 causes each strand to bear against the opposed faces 98 of the blades which forces the strands apart by splitting web 94. In the further alternate embodiment shown in FIG. 10 a pair of opposed rotary knives 100 are provided, each knife having a pair of circular blades 102 which are peripherally bevelled to provide a series of lateral faces 104. As seen in FIG. 10, the entry of a triple stranded bar 106 into the gaps between faces 104 of rotary knives 100 causes strands 106a, 106b and 106c to be split apart as in the embodiment of FIG. 9.

It will be appreciated that the strands of bar 92 may be of any suitable cross-sectional shape; the round strands shown in FIGS. 5 to 10 of the drawings are merely illustrative examples. It will also be appreciated that the embodiment of FIGS. 1 to 7 could be modified, as in FIG. 10 over FIG. 9, to accommodate a multi-stranded bar 92 having three or more strands.

I claim:

1. A device for slitting billets rolled to produce a multiple stranded bar, comprising:
    a frame;
    a guide member mounted on the frame and having a passage therethrough, the guide member being locatable between the rolls of a stand;
    a circular knife rotatably mounted on the frame behind the guide member and having at least one blade peripherally bevelled to provide at least one pair of lateral shoulders;
    means mounted on the frame below the knife to direct the strands against the shoulders of the knife blade whereby the strand is split in advance thereof;
    means mounted on the frame behind the knife and having separate passages to receive and channel the individual strands split by the knife;
    the guide member, the directional means, and the delivery means forming a linear path axially with the gap between the rolls of the stand.

2. A device as claimed in claim 1 in which the channel means is removably mounted on the frame.

3. A device as claimed in claim 2 in which the channel means comprises a trough, a cover for the trough and a divider separating the trough into two parallel passages, and clamping means mountable on the frame to bear against the cover.

4. A device as claimed in claim 1 in which the directional means comprises roller means journally mounted on the frame.

5. A device as claimed in claim 4 in which the knife and the directional means are each journally mounted on a shaft, each of said shafts being removably keyed in the frame.

6. A device as claimed in claim 1 in which the guide member carries ribs registrable with grooves in the rolls of said stand.

7. A device as claimed in claim 1 in which the knife comprises a journalled hub having a central annular depression therein, the knife blade being integral with the hub and dividing the depression into a pair of annular recesses to receive and guide the individual strands when split by the knife blade.

8. A device as claimed in claim 1 including cooling means mounted on the frame and directed onto the knife and onto the directional means.

9. A device as claimed in claim 8 in which the cooling means comprises a pair of conduits mounted on the frame one behind the knife and the other behind the directional means, the conduits being connectable with a source of pressurized water and being perforated towards the knife and towards the directional means.

10. A device as claimed in claim 1 in which the circular knife has a pair of blades.

* * * * *